United States Patent [19]
DeBoalt et al.

[11] Patent Number: 5,426,842
[45] Date of Patent: Jun. 27, 1995

[54] METHOD OF ASSEMBLING BELL AND SPIGOT PIPE JOINTS

[75] Inventors: Stephen L. DeBoalt, Pelham; Randall C. Conner, Warrior; Howard H. O'Daniel, Birmingham, all of Ala.

[73] Assignee: American Cast Iron Pipe Company, Birmingham, Ala.

[21] Appl. No.: 174,783

[22] Filed: Dec. 29, 1993

[51] Int. Cl.6 .............................................. B23P 11/02
[52] U.S. Cl. ....................................... 29/508; 29/272; 29/525.1
[58] Field of Search ................. 29/234, 237, 272, 282, 29/402.01, 402.09, 402.14, 402.15, 506, 508, 525.1; 285/27, 104, 105, 231, 232, 321, 374

[56] References Cited

U.S. PATENT DOCUMENTS

| | | | |
|---|---|---|---|
| 324,154 | 8/1885 | Dare et al. | 285/322 |
| 820,126 | 5/1906 | Phillips | 285/27 |
| 865,498 | 9/1907 | Kenyon | 285/27 |
| 1,065,387 | 6/1913 | Ogg | 285/27 |
| 1,587,689 | 6/1926 | Weiss et al. | 29/272 X |
| 2,310,122 | 2/1943 | Scott . | |
| 3,619,891 | 11/1971 | Harrison | 29/272 |
| 3,979,814 | 9/1976 | Lajoie et al. | 29/272 |
| 4,599,778 | 7/1986 | Dreyfuss et al. | 29/272 |
| 5,197,768 | 3/1993 | Conner | 285/105 |
| 5,347,701 | 9/1994 | Hosseinian et al. | 29/508 |

FOREIGN PATENT DOCUMENTS

| | | | |
|---|---|---|---|
| 682489 | 11/1952 | United Kingdom | 29/272 |
| 682490 | 11/1952 | United Kingdom | 29/272 |
| 688699 | 3/1953 | United Kingdom | 29/508 |
| 428077 | 2/1975 | U.S.S.R. | 29/272 |

OTHER PUBLICATIONS

Kuboto Ltd., "Damaged Pipe Repair Manual", pp. 8-10 (Pub. Date Unknown, but Prior to Dec. 29, 1992).
American Water Works Association, "American National Standard For Rubber Gasket Joints For Ductile Iron Pressure Pipe and Fittings" Jun. 21, 1990.
Stanton and Staveley, "Ductile Iron Pipelines Manual", Dimensional Checks on Pipe Spigots and Ovality Correction, (Two pages) (Publication date unknown, but prior to Dec. 29, 1992).

*Primary Examiner*—Peter Dungba Vo
*Attorney, Agent, or Firm*—Kerkam, Stowell, Kondracki & Clarke

[57] ABSTRACT

A method of and rounding devices for inserting an out-of-round pipe spigot into a pipe bell by installing the rounding devices on the open end of the pipe bell. The rounding devices have cam surfaces for engaging the end of the out-of-round spigot and have sufficient strength and stiffness to deform the out-of-round into a substantially circular cross sectional configuration upon application of insertion force between the bell and spigot. The rounding devices may be removed and reused after the bell and spigot joint is assembled.

14 Claims, 8 Drawing Sheets

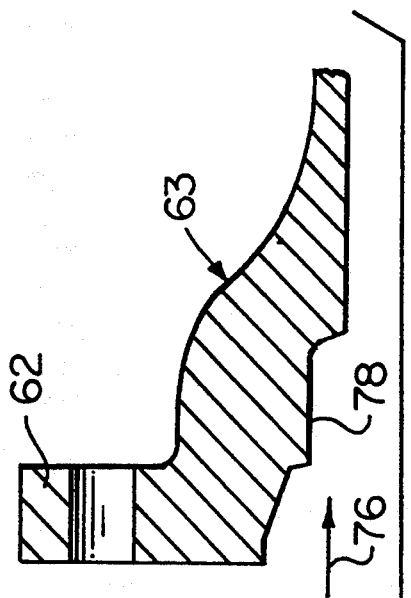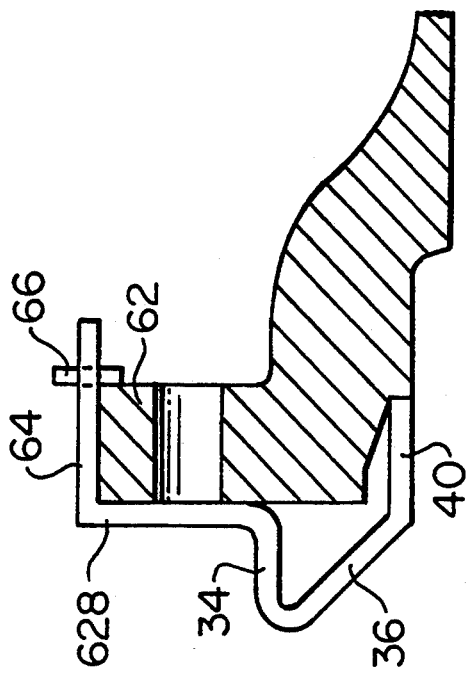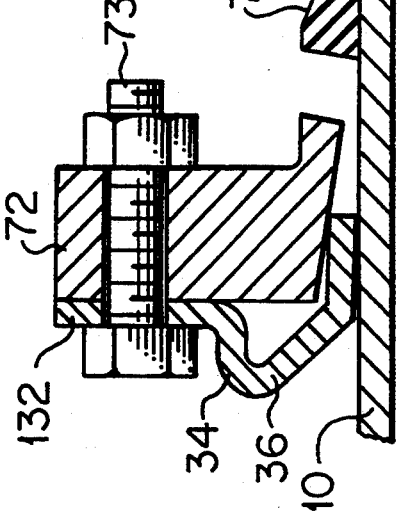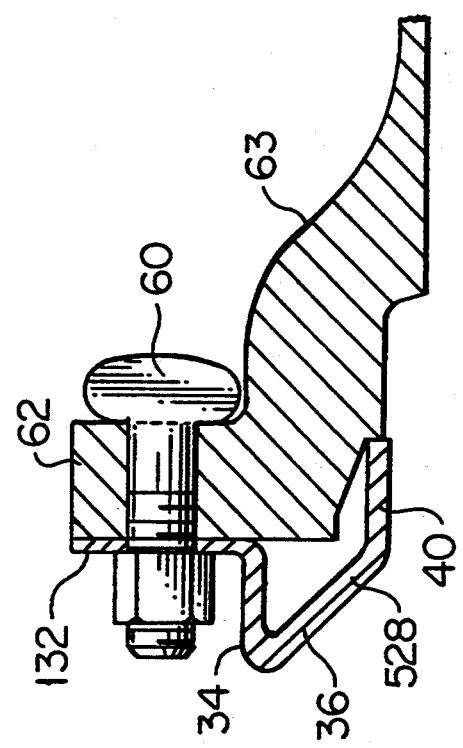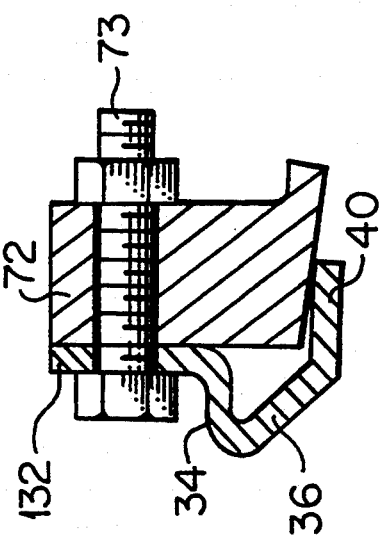

METHOD OF ASSEMBLING BELL AND SPIGOT PIPE JOINTS

BACKGROUND OF THE INVENTION

1. Field of the Invention

This invention relates to a method of and apparatus for use in field-forming bell and spigot joints in pipe, and more particularly to such method and apparatus for use in forming such a joint by inserting a pipe or spigot into a pipe bell or external gland wherein one of the assembled elements is out-of-round.

2. Description of the Prior Art

A push-on bell and spigot pipe joint is conventionally formed by initially installing an elastomeric sealing gasket in a recess within the bell of a first pipe, valve or fitting (hereinafter, pipe), then aligning the spigot end of a second pipe adjacent the open end of the bell and pulling or pushing the second pipe toward the first with a force sufficient to telescope the spigot into the bell through the resilient gasket. Typically, a lubricant is placed upon the external surface of the spigot end to facilitate the telescoping movement and to reduce the likelihood of damage to the elastomeric gasket material.

Mechanical or "stuffing box" joints typically involve assembling a gland onto the spigot and a sealing gasket is mounted on the projecting spigot end. The spigot is then inserted into the mechanical joint socket, or bell, with the gland lip compressing the gasket to form a seal as the gland and bell are bolted together. The term "bell and spigot joint" as used herein is, when appropriate, intended to include both mechanical and push-on bell and spigot joints.

In the manufacture of bell and spigot pipe from ductile iron, rigid plastic or composite material, either the spigot or both the bell and spigot of each length of pipe may be provided with a contoured generally conical surface to facilitate inserting the spigot of one pipe in the bell of another. The camming, or funneling surfaces cooperate during assembly of a joint to guide the spigot into the bell, thereby eliminating the necessity for precise alignment and to some extent also enabling a joint to be formed despite one or both of the pipe ends (typically the spigot end) being slightly out-of-round. The camming or funneling surfaces on both the bell and spigot ends of typical bell and spigot pipe is shown, for example, in U.S. Pat. No. 5,197,768, assigned to the assignee of the present invention. Glands employed for mechanical joints also employ camming surfaces which cooperate with the camming surfaces on the pipe spigot.

In the process of manufacturing bell and spigot pipe, both the bell and spigot ends of each pipe section are typically inspected and, if necessary, subjected to rounding procedures so that the finished pipe is substantially circular in cross section adjacent each end. Despite precautions taken during manufacture, however, the bell and/or spigot end may become slightly out-of-round in cross section. Due to the substantially heavier cross section and the resultant increase in strength and stiffness, the bell section of the as-manufactured pipe is less likely to be out-of-round than the lighter weight spigot end. As indicated above, however, typically the out-of-roundness of the as-manufactured pipe is not so severe that the camming or funneling surfaces will not be effective to cam the spigot into a configuration substantially complementary to the bell during assembly of the joint in the conventional manner without modifying the pipe. During insertion, the greater strength of the bell will result in it retaining essentially its original shape although some deformation, or rounding, of the bell may also occur. Since the deformation of the bell typically is small relative to that of the spigot, it will be assumed herein that only the spigot is rounded during assembly.

While the ends of manufactured pipe are generally round within acceptable limits, it is not uncommon for such pipe to be substantially out-of-round intermediate its ends. Also, it is frequently necessary to cut a length of pipe at a location intermediate its ends to form a joint at a particular location to install a valve, fitting or the like. Thus, it is not uncommon for the cut section to be out-of-round to the extent that the maximum radius of its outer surface substantially exceeds the mating inner surface radius of the entrance to the bell to which the cut section is to be joined, in which case it is necessary to reshape, or "round" the cut end (hereinafter, spigot) before telescoping it into the bell. The rounding procedure must reduce the maximum radius of the spigot at least to the extent that the funneling surface on the spigot and/or bell can complete the rounding action during insertion into the bell.

It is common practice to internally "round" a severely out-of-round pipe end by initially determining the maximum and minimum diameters of the end to be rounded and to apply an expansive force along substantially the minimum diameter. Typically, this is accomplished by a jacking operation, employing a hydraulic or mechanical jack in the open pipe end, along with suitable blocks and resilient pads as required depending upon the diameter of the pipe. The jacking operation may be accompanied by impact loads applied, for example, by striking with a sledge, especially if localized distortion is involved. Frequently, it is necessary to repeat the expansion or jacking operation a number of times to round the pipe sufficiently to enable a joint to be formed. This diametrical jacking procedure requires substantial time and skill to be accomplished effectively and safely.

In an alternate procedure practiced in the past, an external clamping force is applied across the maximum diameter using a beam clamp in which a pair of beams are positioned on diametrically opposite sides of the pipe substantially tangent thereto at the maximum diameter. The beams are forced toward one another by manually turning nuts onto threaded rods extending through openings in the ends of the beams. Again, it may be necessary to repeat this clamping procedure until the pipe will sustain the necessary degree of roundness in those instances where work space does not permit the joint to be formed before the external clamp is removed from the pipe.

It is, therefore, a primary object of the present invention to provide an improved method of forming push-on or mechanical bell and spigot joints employing a bell, gland or spigot which is out-of-round, and to an improved rounding devices for use in forming such bell and spigot joints.

Another object is to provide such an improved method in which removable rounding devices are attached to a pipe bell or external gland, which devices present an extended funneling or camming surface to engage the spigot to round the spigot during insertion of the spigot.

Another object is to provide an improved rounding device which may readily and easily be detachably mounted onto a pipe bell before assembly of the joint, and which may be removed after forming of the joint for reuse.

Another object is to provide such rounding devices which may be employed with various pipe joint configurations and pipe materials and with pipe produced by various manufacturers.

Another object is to provide such a method and device which is particularly well suited for use for forming a bell and spigot joint using a field-cut pipe which is out-of-round.

Another object is to provide such rounding devices which may be left installed as a part of the finished bell and spigot joint to provide improved axial alignment between the joined bell and spigot and thereby improved joint offset performance.

SUMMARY OF THE INVENTION

In the attainment of the foregoing and other objects and advantages, an important feature of the invention resides in a rounding device which may be removably attached to a pipe bell or which, as explained hereinbelow, may be left on the bell in service. When installed on a bell or gland, the device has a surface inclined with respect to the pipe axis to engage a spigot as it is telescoped axially toward the bell. One or more of the devices are used and positioned so that when the inclined surface is contacted by the spigot, this surface funnels or cams the spigot radially inward under influence of the axial force tending to insert the spigot into the bell. Thus, an out-of-round spigot with a maximum diameter significantly greater than the maximum diameter of the bell may be simultaneously rounded and inserted into the bell.

It should be understood that reference in this specification and in the appended claims to an out-of-round pipe or an out-of-round spigot is intended to refer to a pipe or spigot that is out-of-round relative to the bell or gland into which it is to be inserted and that either or both the joined elements may actually be out-of-round. Also, the term out-of-round is intended to refer to a condition resulting in the spigot having at least one local outside radius which exceeds the mating bell entry radius to thereby preclude normal insertion assembly.

The rounding device may be in the form of a ring extending completely or substantially completely around the bell, but preferably is in the form of a relatively straight or arcuate segment, in which case one or more of the devices are employed at the desired location or locations around the bell to engage and cam the spigot and bell or gland into substantially complementary configurations as required to permit insertion during assembly. The devices are particularly useful in forming a bell and spigot joint employing a cut pipe section which may have a substantially plane end, or may have a relatively short bevelled or tapered cam portion field-ground around its outer peripheral edge. Preferably, means are provided for releasably attaching the individual devices to the bell so that the devices may be unattended as the spigot is inserted into the bell to form the joint. After completion of the joint assembly, the devices are preferably removable simply by releasing the attaching means and striking the device as with a hammer with sufficient force to overcome any friction or clamping action between the assembled bell and spigot. Where desired, the devices may be left installed to provide improved offset performance of the completed joint.

BRIEF DESCRIPTION OF THE DRAWINGS

The foregoing and other objects and advantages of the invention will be apparent from the detailed description contained hereinbelow, taken in conjunction with the drawings, in which:

FIGS. 18 and 19 are fragmentary sectional views of a flanged pipe bell showing different means for releasably mounting the rounding device thereon; and FIGS. 20A and 20B show the device of FIG. 18 in use to form a mechanical bell and spigot joint.

DESCRIPTION OF THE PREFERRED EMBODIMENT

Figure 1:
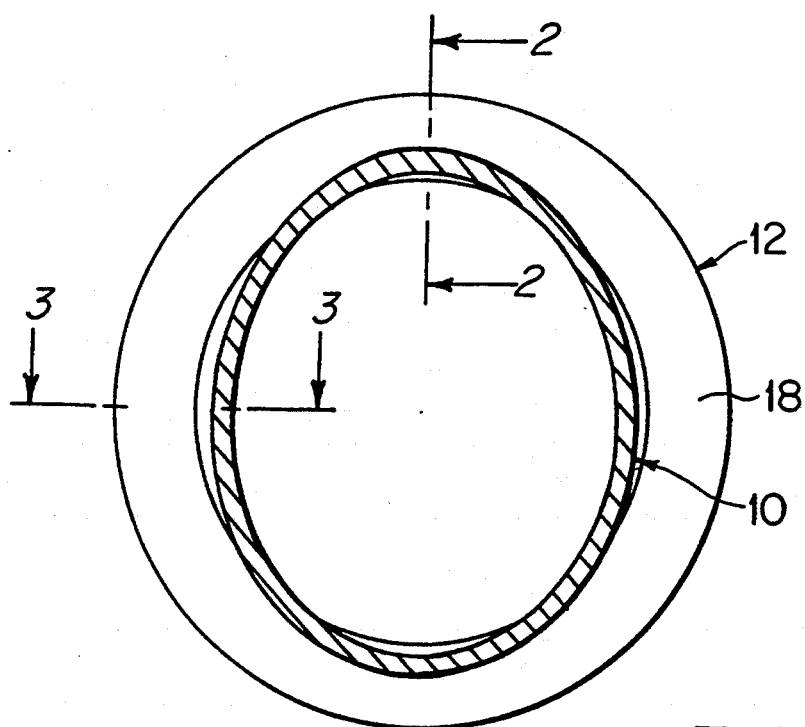
FIG. 1 is a transverse section through an out-of-round pipe spigot in position to be inserted into a pipe bell.
Figure 2:
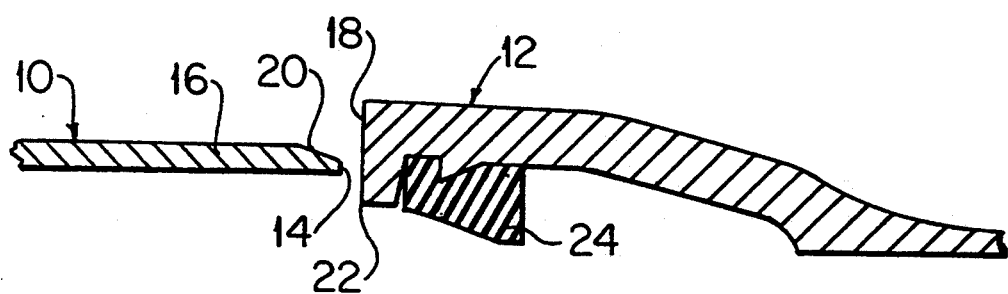
FIG. 2 is an enlarged fragmentary sectional view taken along line 2—2 of FIG. 1.
Figure 3:
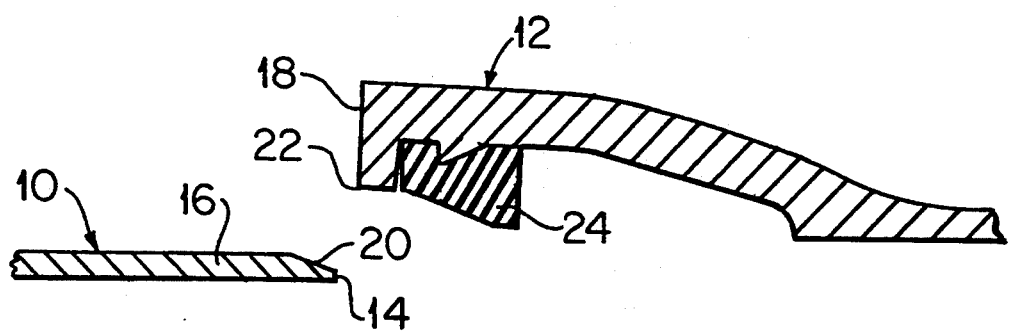
FIG. 3 is an enlarged fragmentary sectional view taken along line 3—3 of FIG. 1.

The problem encountered in assembling a bell and spigot pipe joint wherein either the bell or the spigot (typically the spigot) is out-of-round is schematically illustrated in FIG. 1. For convenience of illustration, an out-of-round spigot end of a pipe 10 is shown as having an elliptical cross section, the major axis of the ellipse being such that the outside "diameter" of the pipe spigot is substantially greater and the minor axis is substantially less than the diameter of the open entrance to the bell section 12 of the adjacent pipe to which the spigot is to be assembled. As a result, as illustrated in FIGS. 2 and 3, the free end face 14 of the spigot section 16 of pipe 10 overlaps and abuts the end face 18 of bell 12 for a finite distance on each side of the major elliptical axis, i.e., at the top and bottom in FIG. 1. At the same time, end face 14 is spaced radially inward from end face 18 for a finite distance on each side of the minor axis, i.e., the sides in FIG. 1. It should be understood that the true elliptical cross section in FIGS. 1 and 4 are atypical and that other out-of-round configurations are frequently encountered.

A bevelled camming or funneling guide surface 20 is formed around the outer end periphery of the spigot when the pipe is formed at the factory. This guide surface 20 is intended to engage and cooperate with the inner peripheral lip 22 of bell 12 to guide the spigot into the open end of the bell during assembly of the joint. This guide surface will act as a cam to distort, or round, a spigot which is slightly out-of-round provided the maximum diameter of the spigot is not so great as to prevent the spigot from starting into the bell. When the maximum spigot diameter is so great that the end faces 14 and 18 come into abutting relationship, however, the guide surface 20 is ineffective to round the spigot, making it necessary to use external or internal "rounding" force to distort the out-of-round pipe back into a substantially round configuration so that the end of the spigot can be started into the open end of the bell.

Figure 4:
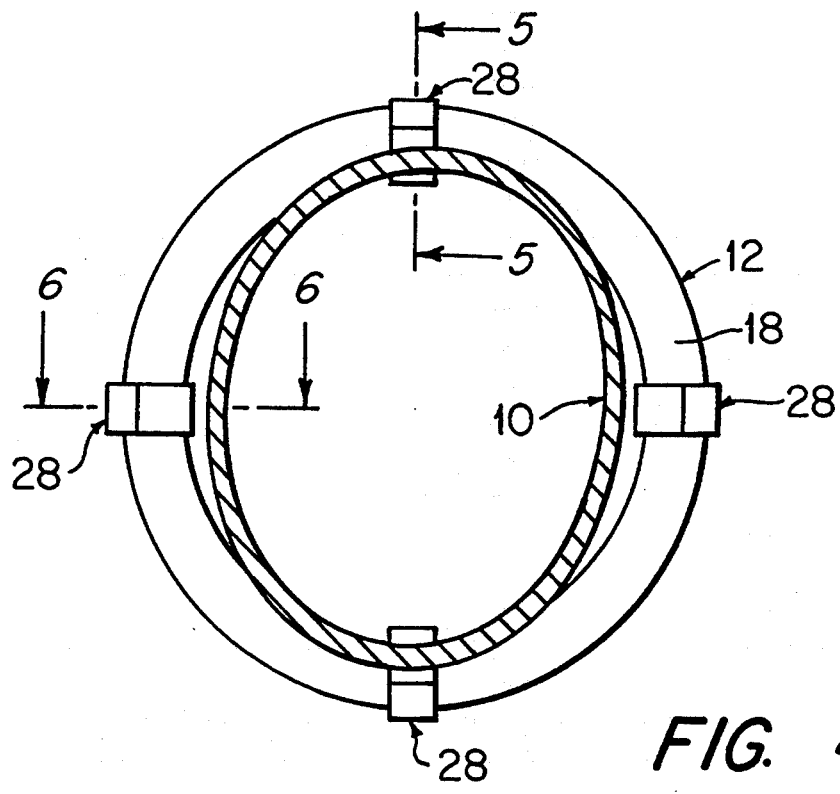
FIG. 4 is a view similar to FIG. 1 with pipe rounding devices according to the present invention mounted on the pipe bell.
Figure 5:
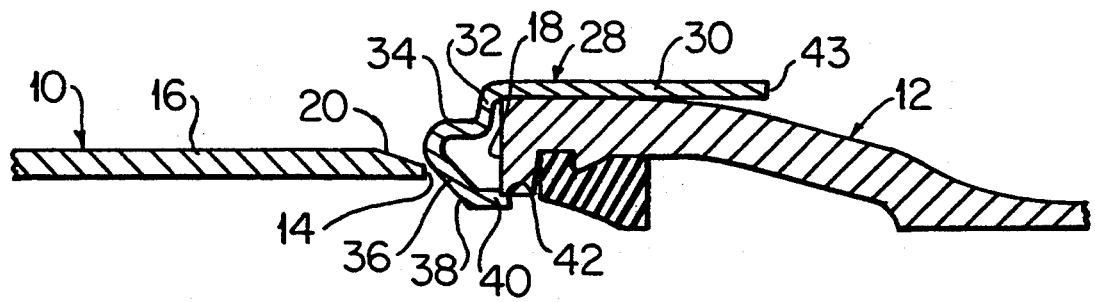
FIG. 5 is an enlarged fragmentary sectional view taken along line 5—5 of FIG. 4.
Figure 6:
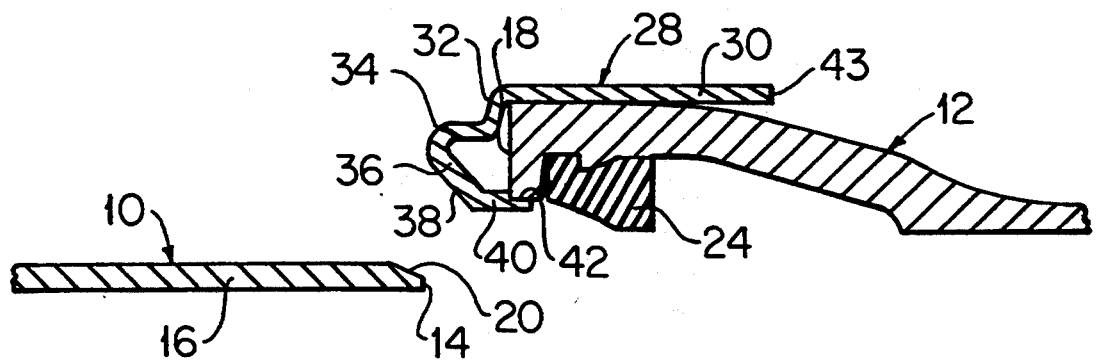
FIG. 6 is an enlarged fragmentary sectional view taken along line 6—6 of FIG. 4.

In accordance with the present invention, rounding devices indicated generally at 28 in FIGS. 4–8 and 10, are provided to enable a bell and spigot joint to be formed by the conventional procedure even when the spigot is so badly out-of-round that its end face overlaps the end face surface 22 of the bell as indicated in FIGS. 1 and 4.

In the embodiment illustrated in FIGS. 4–8 and 10, the rounding device 28 comprises a guide member which may be releasably attached to the bell section 12 and project outwardly from the face 18 to provide a camming, or funneling surface which, when engaged by the open end of the spigot 16 upon relative axial movement between the bell and spigot tending to telescope the spigot into the bell, will cam the spigot back into a substantially round configuration so that it can be moved into the open end of the bell. Once the telescoping action is completed, the interfitting, complementary relation of the bell and spigot will be maintained and the resilient sealing gasket 24 will maintain a fluid-tight seal for the joint in the normal manner and the rounding devices 28 may be removed without affecting the joint.

The rounding device(s) may consist of a continuous or cut annular ring, but preferably consist of a plurality of relatively short ring segments or generally flat shaped bar members which, when placed on the bell provides an inclined surface which is radially and axially convergent to the axis of the pipe bell. The camming surface contacts the spigot at the point of interference to force the spigot radially inward as it is moved axially into the bell. When the rounding device is relatively narrow, a plurality of the devices are employed at spaced intervals around the bell as described below. The relatively short or narrow devices are preferred since they may be readily and easily handled to manually attach individual devices to the bell of various pipe sizes and may be easily removed from the completed joint for reuse, whereas the longer arcuate devices illustrated, for example, in FIGS. 11–13 may be limited to use with a single pipe size.

In a preferred embodiment of the invention, the rounding devices 28 are formed from flat steel bar stock which is bent into a configuration to provide the desired camming surface and to facilitate mounting onto the open end of the pipe bell. It will be understood that the strength and rigidity required will depend upon the size and type of pipe being joined. For example, a relatively high strength, rigid construction is required for use with ductile iron pipe while a lighter construction may be acceptable for use with rigid plastic, composite or rubber pipe sections. Thus, the strength and stiffness of the device need only be sufficient to overcome the ring stiffness of the spigot being inserted into the bell.

In the embodiment of FIGS. 4–8 and 10, the rounding device 28 comprises an elongated body portion 30 adapted to extend axially along the outer surface of the bell 12 adjacent its open end, and a shoulder portion 32 extending at substantially right angles to body 30 in overlying relation to bell face 18 adjacent its outer periphery. An extension or ledge portion 34 projects outwardly from shoulder 32 and is joined to a funneling portion 36 having an axially converging or inclined camming surface 38 for engaging the end of a spigot to be inserted into the bell. The funneling portion 36 terminates in an axially extending lip portion 40 having a notch 42 formed in its radially outwardly directed end surface for seating on the inner peripheral lip 22 of the open end of the bell 12. The notch 42 cooperates with the end face 18 to provide strength for the camming surface to resist deflection during assembly of the joint.

The notch 42 is spaced from the radial inner surface of the elongated body 30 a distance to provide a slight interference fit when telescoped onto the open end of the bell 12. This interference fit enables the rounding device 28 to be mounted by initially hooking the notch 42 into the open end of the bell, then tapping the device as with a hammer to firmly seat the rounding device on the bell.

Figure 7:
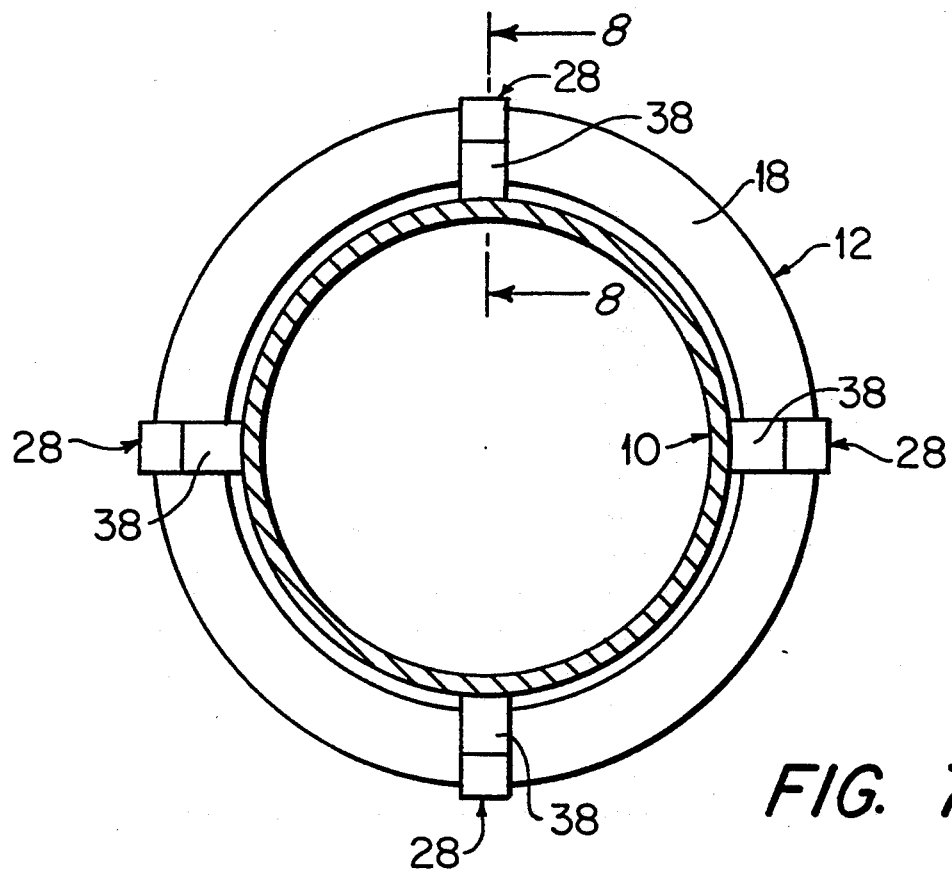
FIG. 7 is a view similar to FIG. 4 showing the pipe spigot partially inserted into the pipe bell.

As shown in FIGS. 4 and 7, when relatively short rounding devices are employed, at least four of the rounding devices 28 are preferably employed. As shown in FIGS. 4 and 7, four of the rounding devices 28 may be arranged with two positioned to engage the spigot in diametrically opposed relation at the major axis of the spigot and two are positioned in opposition to one another in the vicinity of the minor spigot axis to prevent unintentional relative movement between the bell and spigot and to assure proper axial alignment of the joint. The arrangement shown in FIGS. 4 and 7 is also effective in improving offset performance of the finished joint when the devices 28 are left installed.

Figure 8:
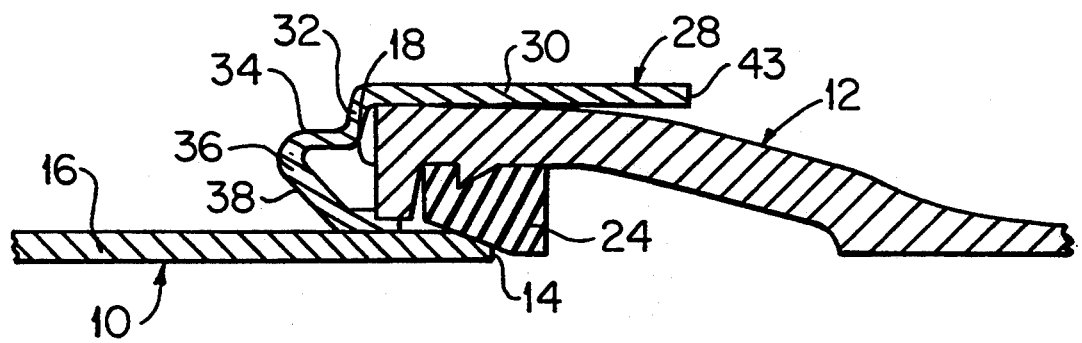
FIG. 8 is an enlarged fragmentary view taken along line 8—8 of FIG. 7.

FIGS. 7 and 8 show use of the rounding devices 28 to assemble the bell and spigot of FIGS. 1–6, with the spigot being partially inserted into the bell as most clearly seen in FIG. 8. As shown in FIG. 7, the spigot 10 has assumed a substantially cylindrical configuration and is maintained in centered relationship with the axial bore of the bell 12 by the four equally spaced rounding devices contacting the outer peripheral surface of the spigot. Further telescoping movement to fully seat the spigot in the bell with the seal 24 forming the fluid-tight seal will be accomplished with the spigot maintained in the coaxial, centered relation shown in FIG. 7. It is apparent that, during the initial insertion of the spigot into the bell, the shoulder formed by the notch 42 engaging the end surface 18 of the bell will strengthen and provide additional stability to the rounding device. After the joint is completely formed, the rounding devices 28 may be removed, if desired, by striking the end 43 of body 30 with a hammer or the like.

Figure 9:
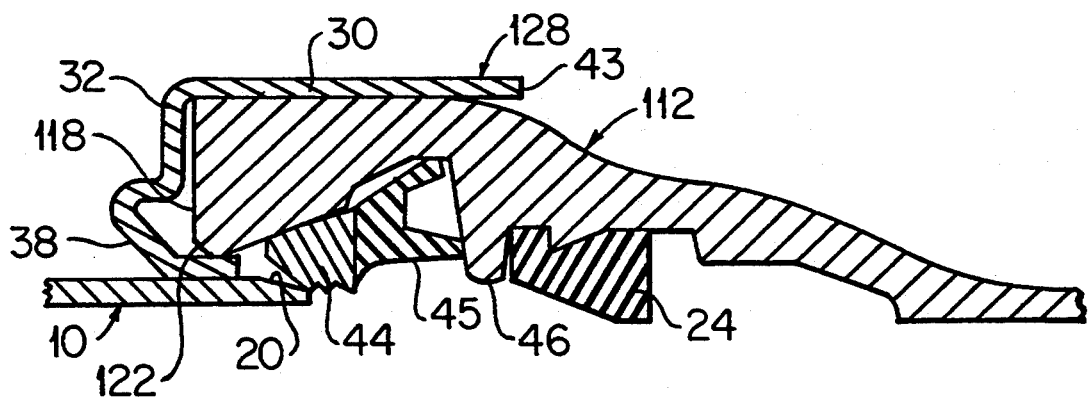
FIG. 9 is a view similar to FIG. 8 showing the apparatus used to assemble a locking ring-type bell and spigot joint.

FIG. 9 illustrates the use of a rounding device 128 similar to that just described for assembling a bell and spigot joint in which the bell of a commercially available ductile iron pipe incorporates a locking ring feature of the type shown in U.S. Pat. No. 5,197,768. This embodiment differs only from the rounding devices 28 described above in that the lip 40 is not provided with a notch since the entrance to the locking ring section of the bell 112 is provided with a generally conical funneling surface around its inner peripheral edge 122 and the shoulder portion 32 is slightly longer to accommodate the increased radial dimension of the bell face 118. In this configuration, after the spigot 16 is telescoped past the locking ring 44 and resilient backing ring 45, the tapered guide surface 20 will engage the inner periphery of the sealing gasket retaining ring 46 to be guided therethrough past the sealing gasket 24 to complete the joint.

Figure 10:
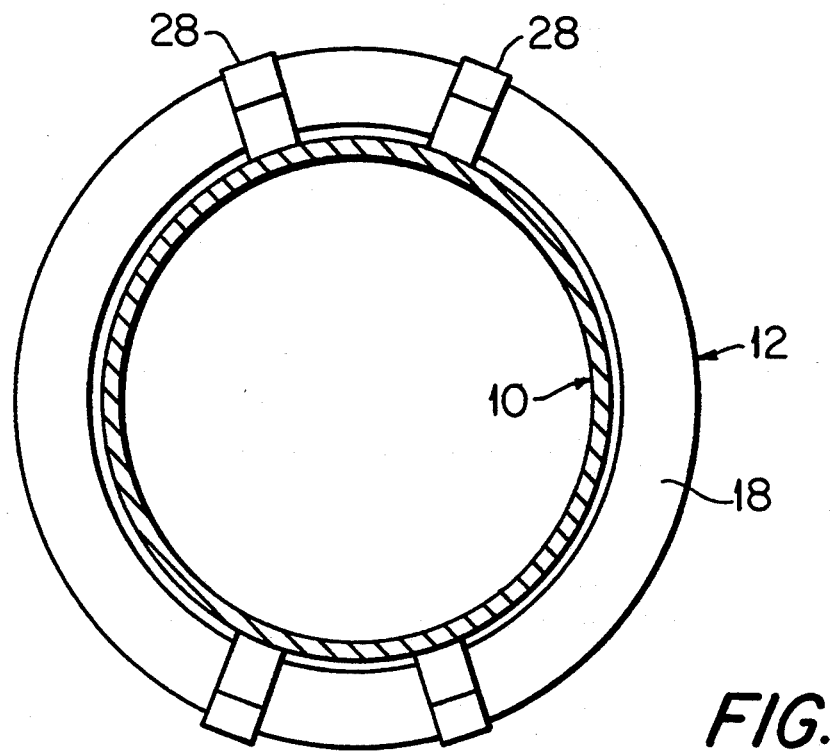
FIG. 10 is a view similar to FIG. 7 but showing the rounding devices installed at different locations to form the bell and spigot joint.

FIG. 10 illustrates an alternate method of forming a bell and spigot joint using the rounding devices illustrated in FIGS. 4–9. In this configuration, two rounding devices 28 are positioned in offset relation to the major axis of the elliptical, or out-of-round spigot on each side of the pipe. This arrangement works similar to that described above, but provides increased camming surface and increased strength for rounding severely out-of-round pipe.

Figure 11:
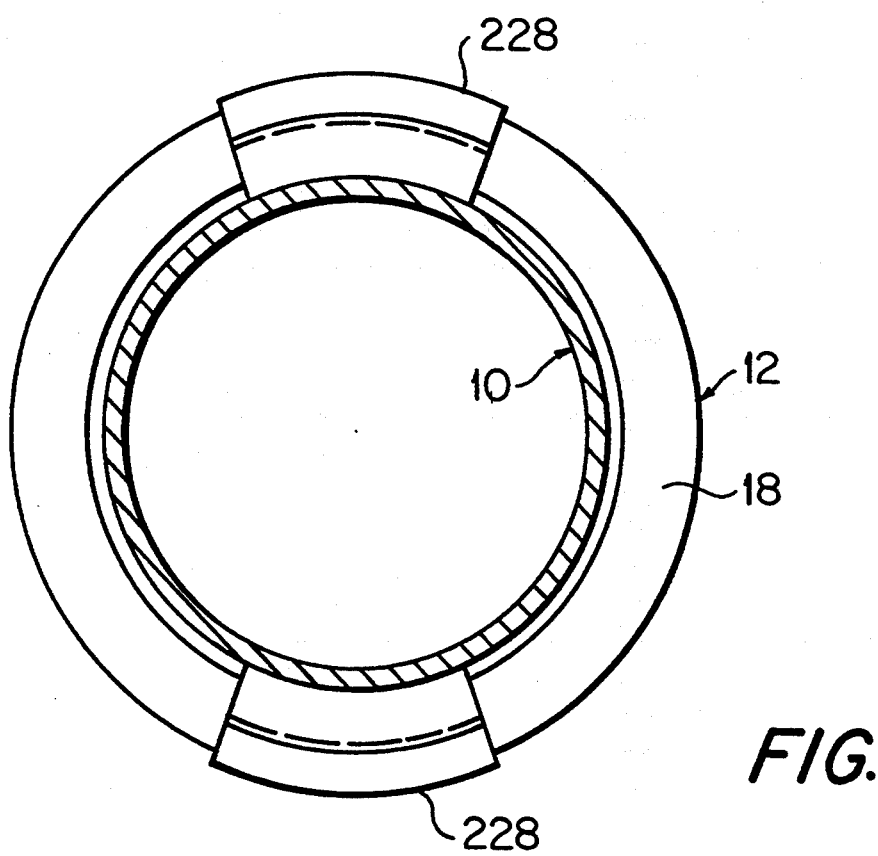
FIG. 11 is a view similar to FIG. 10 showing an alternate embodiment of the invention.
Figure 12:
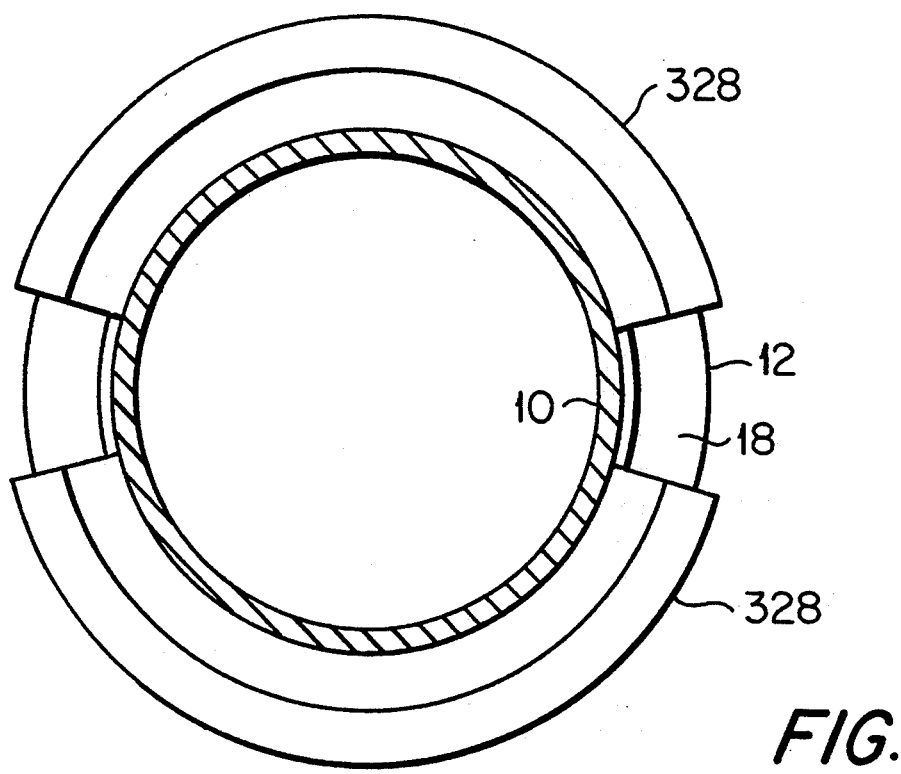
FIG. 12 is a view similar to FIG. 11 showing a further alternate embodiment of the rounding device.

Further modifications of the invention are indicated in FIGS. 11 and 12 where the rounding devices 228 and 328, respectively, have an arcuate configuration conforming to the configuration of the bell section of the pipe, with the arcuate extent of these embodiments being substantially greater than the generally straight-sided or flat bar embodiments 28 and 128. The greater radial extent of the rounding device 228 and 328 makes it practical to use only a single pair of the devices in rounding an out-of-round spigot. While the configuration shown in FIGS. 11 and 12 may be preferred for relatively small pipe, the size and weight required for larger diameter pipe make the embodiment of FIG. 11 very heavy and awkward to handle. Also, as pointed out hereinabove, the configuration shown in FIGS. 11 and 12 normally can only be used for a single size pipe whereas the shorter devices may be employed with a wide range of pipe sizes.

Figure 13:
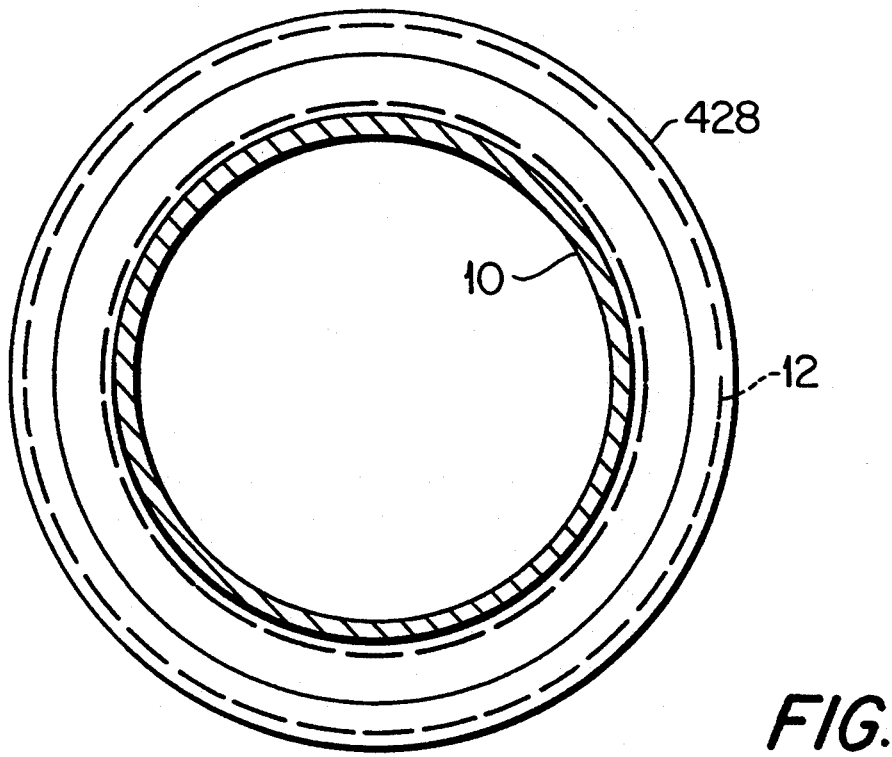
FIG. 13 is a view similar to FIG. 12 and showing a further embodiment of the device.

FIG. 13 illustrates a further embodiment in which the rounding device 428 is in the form of a complete ring. The cross section of this ring may be identical to that described above, although it is apparent that this embodiment is generally intended as a single use device since it normally could not easily be removed from a bell and spigot pipe if it were dislodged from the joint. If desired, this ring may have a single radial cut formed completely therethrough to permit limited circumferential expansion or contraction to accommodate minor dimensional variations in the pipe.

Figure 14:
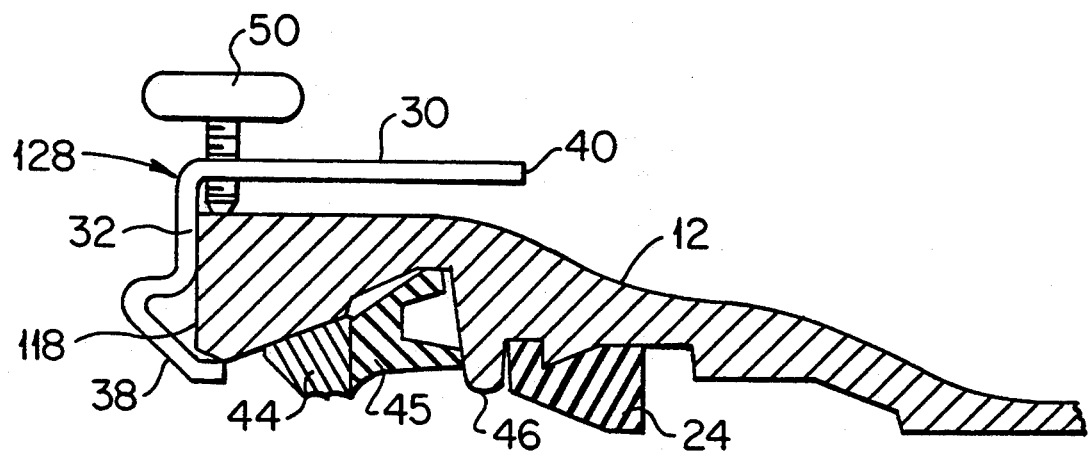
FIGS. 14, 15, 16 and 17 are fragmentary sectional views of a pipe bell showing different means for releasably mounting the rounding device thereon.

In each of the rounding devices 28, 128, 228, 328 and 428 described above, the radial distance between the lip 40 and the body 30 must conform very closely to the radial thickness of the open end of the bell on the pipe to which the rounding device is to be mounted. As a result, it is necessary to have different size rounding devices for each pipe size employing different wall thickness at the open end of the bell. Further, dimensional tolerances in the pipe, as manufactured, could result in the rounding devices having a loose fit, making it more difficult to retain the devices in position while maneuvering the section of pipe which is to be joined to the bell. This problem is overcome by the modifications shown in FIGS. 14–17 wherein the rounding device 128 include means for accommodating different thicknesses of the pipe bell end. In the embodiment illustrated in FIG. 14, the configuration of the rounding device is substantially the same as described above, except that the radial extent of the shoulder portion 32 is greater so that the body 30 is spaced from the outer surface of bell 12. The elongated body 30 is provided with a threaded opening which receives a winged screw 50 or other suitable threaded member which may be turned into contact with the outer surface of the bell 12 to releasably retain the rounding device on the open end of the bell.

Figure 15:
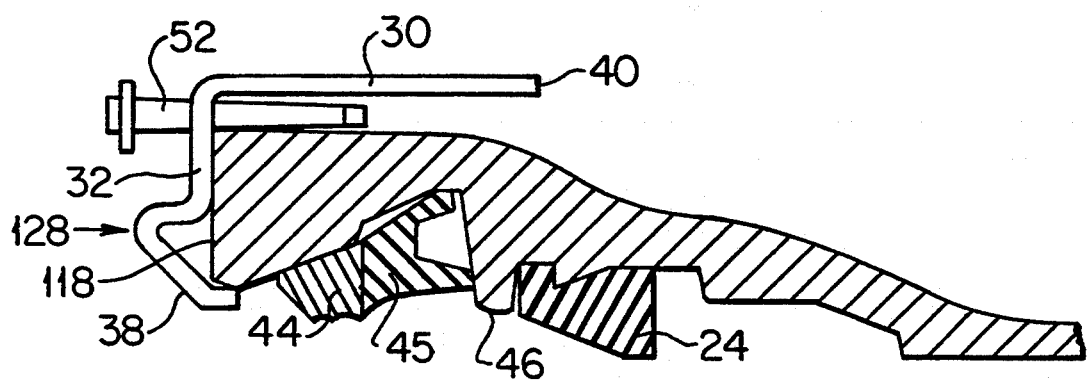

An alternate arrangement of the attachment means is illustrated in FIG. 15 wherein a through opening is provided in the elongated shoulder portion 32 of the rounding device, and a tapered wedge pin 52 is mounted in the opening to be driven into wedging relation with the bell outer surface to releasably attach the device to the bell.

Figure 16:
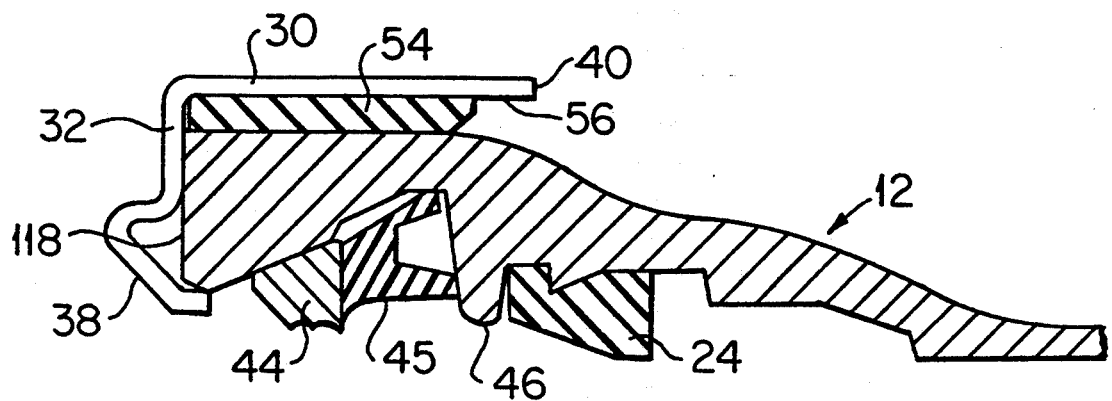

In the modification of FIG. 16, the rounding device is substantially the same as described above with regard to FIGS. 14 and 15 except that a layer of resilient material 54 such as a foamed rubber is preferably attached, as by bonding, to the surface 56 of body 30 in position to engage and be compressed by the outer surface of the bell 12 when the rounding device is installed.

Figure 17:
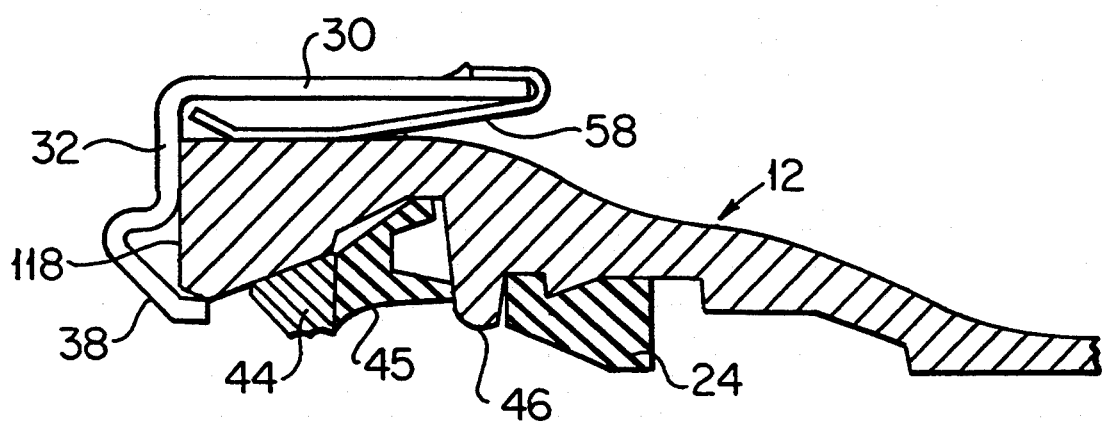

In FIG. 17, the resilient material is replaced with a leaf spring element 58 attached, as by welding, to the body 30 of the rounding device.

As mentioned hereinabove, the rounding device may also be employed in forming a joint employing external glands, flanged pipe, or other fittings, and a rounding device 528 suitable for use in connection with such flanged pipe or fittings is illustrated in FIG. 18. This embodiment is similar to device 128 from which the elongated body portion of the rounding device is eliminated, and an opening is provided in the shoulder portion 132 for receiving a bolt 60 or other threaded fastener for attaching the device directly to the face of the flange 62 of the mechanical joint pipe bell 63.

FIG. 19 illustrates a rounding device 628 similar to the device 528 of FIG. 18 in which a body portion 64 is adapted to extend axially along and in contact with the outer surface of the flange 62, and a removable pin 66 is employed to engage the back face of the flange to releasably support the rounding device on the flange. Preferably, the pin is tapered and located to provide a slight wedging action with the flange to provide more secure support.

FIG. 20A illustrates the rounding device of FIG. 18 mounted on the back face on a gland 72, where the rounding device is held in place by a removable bolt 73. The gland is then pressed onto the open spigot 16 of a pipe 10 and a mechanical joint gasket 74 is mounted on the spigot as shown in FIG. 20B. The rounded spigot is then inserted into the bell of a pipe or fitting by movement in the direction of the arrow 76. Once the spigot is in the recessed portion 78 of the bell, the bolt 73 is removed and the rounding device is removed before the conventional flange bolts are installed to complete the joint.

While various modifications and embodiments have been described, it is believed apparent that numerous other modifications may be made without departing from the spirit of the invention. It is important, however, that the rounding device be of sufficient strength to provide the necessary camming force to cam an out-of-round pipe such as a ductile iron pipe into the configuration to be telescoped into the open end of the receiving bell, gland, or the like. Further, the cam surface provided by the rounding device must have sufficient length, and be disposed at an angle to engage the peripheral edge of the opened end of a severely out-ofround pipe to force it into the desired round configuration.

Rounding devices constructed substantially as illustrated in FIGS. 4–9 have been employed to repeatedly and consistently form bell and spigot joints in 36" ductile iron pipe in which the spigot is 2.75 inches out-of-round, i.e., wherein the difference between the major and minor axes of generally elliptical shaped spigot is 2.75 inches. Use of the rounding devices to form bell and spigot joints wherein the spigot is out-of-round saves substantial time, and is very easy and safe to use.

As indicated above, the rounding devices may, if desired, be left in place after the joint is assembled. In certain circumstances, it may be desirable not to remove the devices, and even to employ the devices when the joint can be assembled without their use. For example, when excessive offset loads are or could be encountered, the devices may be relied upon to carry a portion of such load and relieve the uneven or eccentric deformation of the sealing gasket employed in push-on joints. ANSI/AWWA Standards establish performance requirements for water pipes in the offset condition. Since the rounding devices of the present invention tend to center the bell and spigot components of a joint, it is believed apparent that, if left installed, the devices will tend to limit relative lateral movement between the bell and spigot at the joint and thereby significantly decrease offsetting and improve performance, particularly for larger pipes.

While preferred embodiments of the invention have been disclosed and described, it should be apparent that the invention is not so limited but rather that it is intended to include all embodiments thereof which would be apparent to one skilled in the art and coming within the spirit and scope of the invention.

We claim:

1. A method of inserting a pipe spigot into a pipe bell to form a bell and spigot joint when the spigot is out-of-round relative to the bell by an amount providing at least one outer radius of the spigot greater than the mating bell entry radius, comprising:

releasably mounting at least one pipe rounding device on the open end of the pipe bell to be joined, each said at least one rounding device including a guide member providing an outwardly diverging guide surface having an inner edge terminating in a lip extending into and engaging the inner surface of the bell adjacent the open end and an outer edge spaced radially outward from the inner edge and axially outward from the open end of the bell, and a support shoulder engaging the open end of the bell, positioning the out-of-round pipe spigot in axial alignment with the pipe bell and in contact with the guide surface of said at least one rounding device, and applying an axial insertion force between the spigot and the bell to telescope the spigot into the open end of the bell, said at least one outer radius of the spigot being oriented relative to said at least one rounding device to engage the guide surface on said at least one rounding device to cam the spigot into a rounded condition substantially complementary to said bell upon relative axial movement between the spigot and bell, the guide surface being inclined at an angle relative to the axis of the pipe to be joined and being of sufficient rigidity to overcome the hoop strength of the pipe spigot upon application of the insertion force.

2. The method defined in claim 1 wherein the step of releasably mounting at least one rounded device on said pipe bell comprises releasably mounting at least two of said rounding devices on said open end of the pipe bell, said rounding devices being arranged in pairs in substantially diametrically opposed relation to one another on said pipe bell open end.

3. The method defined in claim 2 wherein said rounding devices are generally arcuate and wherein said guide surface is generally conical.

4. The method defined in claim 2 wherein said guide surface is generally planar.

5. The method defined in claim 4 wherein at least two pairs of said rounding devices are mounted on said pipe bell open end.

6. The method defined in claim 5 further comprising the step of removing said at least one rounding device after the spigot is telescoped into the bell to form the joint.

7. The method defined in claim 5 wherein said rounding devices are mounted on said pipe bell at substantially 90° intervals around the open end thereof.

8. A method of forming a mechanical bell and spigot pipe joint by initially telescoping a joint gland onto a pipe spigot which is out-of-round relative to the gland by an amount providing at least one outer radius of the spigot greater than the inner radius of the mating gland surface, the gland having a front face adapted to be bolted to a bell flange and a back face, the method comprising the steps of:

releasably mounting at least one pipe rounding device on the back face of the gland, each said rounding device including a guide member providing an outwardly diverging guide surface having an inner edge terminating in a lip extending into and engaging the inner surface of the gland and an outer edge spaced radially outward from the inner edge and axially outward from the back face of the gland, and a support shoulder engaging the back face of the gland, positioning the out-of-round pipe spigot in axial alignment with the gland and in contact with the guide surface of said at least one rounding device, applying an axial insertion force between the spigot and the gland to telescope the gland onto the outer surface of the spigot, said at least one outer radius of the spigot being oriented relative to said at least one rounding device to engage the guide surface on said at least one rounding device to cam the spigot into a rounded condition substantially complementary to said gland upon relative axial movement between the spigot and gland, the guide surface being inclined at an angle relative to the axis of the pipe and gland to be joined and being of sufficient rigidity to overcome the hoop strength of the pipe spigot upon application of the insertion force, mounting a sealing gasket on the spigot between the end thereof and the gland, and inserting the spigot into the bell and bolting the gland to the bell flange.

9. The method defined in claim 8 further comprising the step of removing said at least one rounding device after the gland is telescoped onto the spigot.

10. The method defined in claim 8 wherein the step of releasably mounting at least one rounded device on said gland comprises releasably mounting at least two of said rounding devices on said gland, said rounding devices being arranged in pairs in substantially diametrically opposed relation to one another on said gland.

11. The method defined in claim 10 wherein said rounding devices are generally arcuate and wherein said guide surface is generally conical.

12. The method defined in claim 10 wherein said guide surface is generally planar.

13. The method defined in claim 12 wherein at least two pairs of said rounding devices are mounted on said pipe bell open end.

14. The method defined in claim 13 wherein said rounding devices are mounted on said pipe bell at substantially 90° intervals around the open end thereof.

* * * * *